(12) United States Patent
Fajardo et al.

(10) Patent No.: US 6,445,862 B1
(45) Date of Patent: Sep. 3, 2002

(54) DISPERSION COMPENSATING PHOTONIC CRYSTAL FIBER

(75) Inventors: James C. Fajardo, Painted Post; V. Srikant, Ithaca; James A. West, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 8 days.

(21) Appl. No.: 09/596,916

(22) Filed: Jun. 20, 2000

(51) Int. Cl.⁷ .................................................. G02B 6/02
(52) U.S. Cl. ........................................ 385/125; 385/123
(58) Field of Search ................................. 385/123–128

(56) References Cited

U.S. PATENT DOCUMENTS

| | | | |
|---|---|---|---|
| 5,361,319 A | 11/1994 | Antos et al. | 385/123 |
| 5,703,987 A | * 12/1997 | Imoto | 385/126 |
| 5,802,236 A | 9/1998 | DiGiovanni et al. | 385/127 |
| 5,838,867 A | 11/1998 | Onishi et al. | 385/123 |
| 6,097,870 A | * 8/2000 | Ranka et al. | 385/127 |
| 6,334,017 B1 | * 12/2001 | West | 385/123 |

FOREIGN PATENT DOCUMENTS

JP  2000-35521 A  *  2/2000

* cited by examiner

Primary Examiner—Hemang Sanghavi
Assistant Examiner—Michael J. Stahl
(74) Attorney, Agent, or Firm—Harness, Dickey & Pierce, P.L.C.

(57) ABSTRACT

A fiber optic waveguide is disclosed. The fiber optic waveguide includes a core region, and a moat region surrounding the core region. A cladding region surrounds the moat region and the core region. The cladding region includes a lattice of column structures disposed within a solid background matrix. A diameter of the core region is sized for making contact with the moat region for creating an extended core region at longer wavelengths. The core region, the moat region, and the cladding region function to produce unique dispersion compensating properties, which include negative dispersion and positive dispersion. The core region may be formed from a high index material and the moat region may be formed from a material having a refractive index lower than the refractive index of the core region. The cladding region is formed from a material having a refractive index which is higher than the index of the moat region and lower than the refractive index of core region.

15 Claims, 4 Drawing Sheets

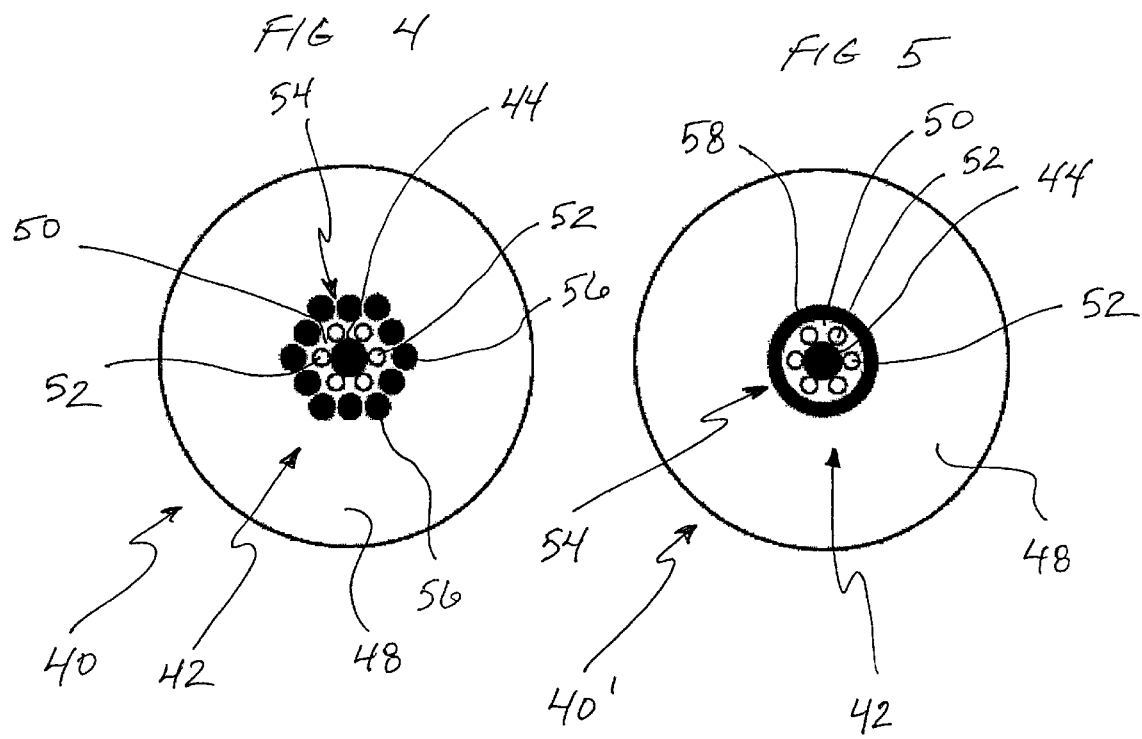
FIG 4
FIG 5
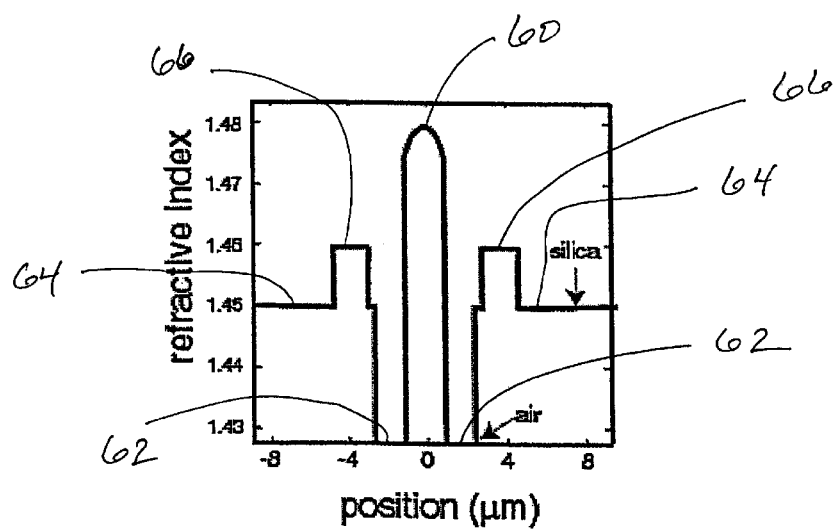
FIG 6

DISPERSION COMPENSATING PHOTONIC CRYSTAL FIBER

BACKGROUND OF THE INVENTION

The present invention relates generally to a photonic crystal optical waveguide structure for an optical communication system. More particularly, the present invention is directed to an optical fiber micro-structure having photonic crystal characteristics for producing dispersion compensating properties.

TECHNICAL BACKGROUND

Optical waveguide fibers can be generally classified into single-mode fiber and multimode fiber. Both types of optical fiber rely on total internal reflection (TIR) for guiding the photons along the fiber core. Typically, the core diameter of single-mode fiber is relatively small, thus allowing only a single mode of light wavelengths to propagate along the waveguide. Single-mode fiber can generally provide higher bandwidth because the light pulses can be spaced closer together, and are less affected by dispersion along the fiber. Additionally, the rate of power attenuation for the propagating light is lower in a single-mode fiber. Optical fibers which maintain their single mode characteristics for all wavelengths are defined as endlessly single mode fibers.

Optical fibers having a larger core diameter are generally classified as multimode fibers, and allow multiple modes of light wavelengths to propagate along the waveguide. The multiple modes travel at different velocities. This difference in group velocities of the modes results in different travel times, causing a broadening of the light pulses propagating along the waveguide. This effect is referred to as modal dispersion, and limits the speed at which the pulses can be transmitted; in turn limiting the bandwidth of multimode fiber. Graded-index multimode fiber (as opposed to step-index multimode fiber) has been developed to limit the effects of modal dispersion. However, current multimode and graded-index multimode fiber designs still do not have the bandwidth capabilities of single-mode fiber.

Photonic crystals are another means by which photons (light modes) can be guided through an optical waveguide structure. Rather than guiding photons using TIR, photonic crystals rely on Bragg scattering for guiding the light. The characteristic defining a photonic crystal structure is the periodicity of dielectric material along one or more axes. Thus, photonic crystals can be one-dimensional, two-dimensional and three-dimensional. These crystals are designed to have photonic band gaps which prevent light from propagating in certain directions within the crystal structure. Generally, photonic crystals are formed from a periodic lattice of dielectric material. When the dielectric constants of the materials forming the lattice are different, and the material absorbs minimal light, the effects of scattering and Bragg diffraction at the lattice interfaces allow the photons to be guided along or through the photonic crystal structure.

An exemplary photonic crystal 10 which is periodic in two directions and homogeneous in a third is shown in FIG. 1. More specifically, photonic crystal 10 comprises a triangular lattice of dielectric columns 12, extending in the Z-axis direction, which are periodic in the X-axis and Y-axis directions (measured center to center). The photonic crystal 10 is assumed to be homogeneous in the Z-axis direction. It is also known that a defect can be introduced into the crystalline structure for altering the planar propagation characteristics and localizing the light modes. For example, photonic crystal 10 includes a central column 14 (shown as a solid black column) comprising a dielectric material that is different from the other periodic columns 12. Additionally, the size and shape of central column 14 can be modified for perturbing the single lattice site.

The characteristics of the crystalline structure may be used for producing a photonic band gap. The defect in the crystalline structure created by central column 14 allows a path for light to travel through the crystal. In effect the central column 14 creates a central cavity which is surrounded by reflecting walls. Light propagating through the central column 14 (along the Z-axis direction) becomes trapped within the resulting photonic band gap and cannot escape into the surrounding periodic columns 12. Thus it has been demonstrated that light, whether a pulse or continuous light, can also be guided through this type of photonic band gap crystal. These same structures can be used as effective index structures where the defect acts as a high index core region for guiding light by total internal reflection.

An optical waveguide fiber having a photonic crystal cladding region known within the prior art is shown in FIG. 2. The photonic crystal fiber (PCF) 16 includes a porous clad layer 18, containing an array of air voids 20 that serve to change the effective refractive index of the clad layer 18. This in turn serves to change the properties of the fiber 16 such as the mode field diameter or total dispersion. The air voids 20 defining the clad layer 18 create a periodic matrix around the central fiber core 22, usually formed from solid silica.

Optical fibers having photonic crystal structures can also be designed which provide unique dispersion characteristics. These characteristics include both positive and negative dispersion. For positive dispersion (D>0) a light pulse may be broadened by slowing the lower (red) frequency components forming the light pulse compared to the higher (blue) frequency components forming the light pulse. Such a light pulse is said to be negatively-chirped. Conversely, for negative dispersion (D<0) a light pulse may be broadened by slowing the higher (blue) frequency components compared to the lower (red) frequency components. Such a light pulse is said to be positively-chirped. Chirped pulses may be narrowed to their original width by transmission through an optical system which reverses the chirp. For example, a pulse which becomes negatively chirped after transmission through an optical fiber with D1>0 and length L1 may be unchirped by transmission through an optical fiber with D2<0 and L2=−L1*D1/D2. In both cases, the pulse will appear to become broader. Such fibers have potential for use in dispersion compensating modules, a preferred component for upgrading older long haul communication networks. The dispersion compensating fiber within a dispersion compensating module compensates for the chromatic dispersion in an existing communication link, thereby allowing operation of the communication link at a different wavelength. Accordingly, an incentive exists for developing reliable and reproducible optical fiber for producing unique dispersion properties which can be used, for example, in dispersion compensating modules.

FIG. 3A shows an exemplary index profile for a typical effective index optical fiber. The graph shows the relationship between the refractive index versus the position within the optical fiber. More specifically, the index profile shows that the optical fiber has a high index core region 24 which is surrounded by a low index cladding region 26. The graph of FIG. 3A is generally representative of the index profile of PCF 16 shown in FIG. 2. FIG. 3A is provided primarily for comparison with the index profiles of FIGS. 3B and 3C.

FIG. 3B shows the index profile of an exemplary dispersion compensating optical fiber. The index profile graph shows a fiber having a high index core region 28 surrounded by a low index moat region 30. The low index moat region 30 is then surrounded by an intermediate index cladding region 32. FIG. 3C shows the index profile for another exemplary dispersion compensating fiber which is similar to that of FIG. 3B. The fiber of FIG. 3C also includes a high index core region 28, a low index moat region 30, and an intermediate index cladding region 32 surrounding the moat region 30. The fiber of FIG. 3C includes an additional higher index feature 34 surrounding the moat region 30 for shifting the cutoff wavelength of the optical fiber. In order to obtain large negative dispersion, the core region of the optical fiber must typically be small and the index contrast between the core region and the cladding region must be high.

Throughout the world, optical communication system operators are moving toward 10 Gb/s transmission speeds to meet an ever-growing demand for network capacity. As part of this transition, millions of miles of existing standard single-mode optical fiber must be upgraded from optimization for operation at 1310 nm to optimization for operation in the 1550 nm window. As optical systems and networks are upgraded to higher transmission speeds, chromatic dispersion is often the factor limiting performance. The dispersion wavelength characteristic of the single-mode optical fiber is such that dispersion is effectively zero at a wavelength of 1310 nm and increases as the wavelength increases or decreases from 1310 nm. At a wavelength of 1550 nm, a large positive dispersion may be created. Therefore, when light with a wavelength of 1550 nm is transmitted over existing communication links constructed of single-mode optical fibers designed to transmit at wavelengths of 1310 nm, the waveform becomes distorted from the effects of chromatic dispersion.

Although fiber designs with very low dispersion are available, systems utilizing such fibers are typically limited by non-linear effects such as four-wave mixing. In order to combat dispersive effects in existing deployments, the preferred solution is to install dispersion compensating modules (DCMs) which cancel the dispersive effects on a span-by-span basis. These modules require very high dispersion (usually negative as opposed to positive), relatively low loss, and more recently broadband performance, also referred to as dispersion slope compensation. As part of the next generation DCM systems, it has been suggested that photonic crystal fibers be developed for use within the DCM.

Chromatic dispersion is caused by a variation in the group velocity of light travelling within an optical fiber as the optical frequency changes. A data pulse always contains a spectrum of wavelengths. As the pulse travels along the fiber, the shorter wavelength components travel faster than the longer wavelength components. This effect broadens the pulse and causes it to interfere with adjacent pulses and distort the transmission signal.

One technique for combating the effects of chromatic dispersion is to install a dispersion compensating module (DCM) such as the PureGain DCM Module from Corning Incorporated, at a point along the fiber optic link. Such a DCM utilizes a dispersion compensating fiber. One example is that disclosed in U.S. Pat. No. 5,361,319, also assigned to Corning Incorporated, the assignee of the present invention. The dispersion compensating fiber introduces high levels of dispersion over a relatively short length, which offsets or cancels the dispersion accumulated by a pulse travelling through optically amplified systems on standard single-mode fiber.

An advantage realized through photonic crystal fiber (PCF) structures is that the large contrast between core and clad effective index afforded by these structures can produce unique dispersion characteristics. In view of the advantages associated with PCF structures, it is desirable to provide an optical waveguide PCF which produces relatively high negative or positive signal dispersion characteristics. It is further desirable to provide an optical fiber having a PCF structure which can be used as a component in dispersion compensating modules for optical fiber communication networks.

SUMMARY OF THE INVENTION

In accordance with the teachings of the present invention, a fiber optic waveguide is disclosed. The fiber optic waveguide includes a core region, and a moat region surrounding the core region. A cladding region surrounds the moat region and the core region. The cladding region includes a lattice of column structures disposed within a solid background matrix. A diameter of the fiber core region is sized for making contact with the moat region for creating an extended core region at longer wavelengths when compared to the diameter of the fiber core region. The core region, the moat region, and the cladding region function to produce unique dispersion compensating properties, which include negative dispersion and positive dispersion. The core region may be formed from a high index material and the moat region may be formed from a material having a refractive index lower than the refractive index of the core region. The cladding region is formed from a material having a refractive index which is higher than the index of the moat region and lower than the refractive index of core region.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

FIG. 4 is a cross-sectional view of a dispersion compensating fiber having a photonic crystal type structure in accordance with a preferred embodiment of the present invention;

FIG. 5 is a cross-sectional view of a dispersion compensating fiber having a photonic crystal type structure in accordance with an alternate preferred embodiment of the present invention;

FIG. 6 is a graph showing the index profile of the dispersion compensating fibers of FIGS. 4 and 5.

DETAILED DESCRIPTION OF THE PREFERRED EMBODIMENTS

Figures 1, 2:
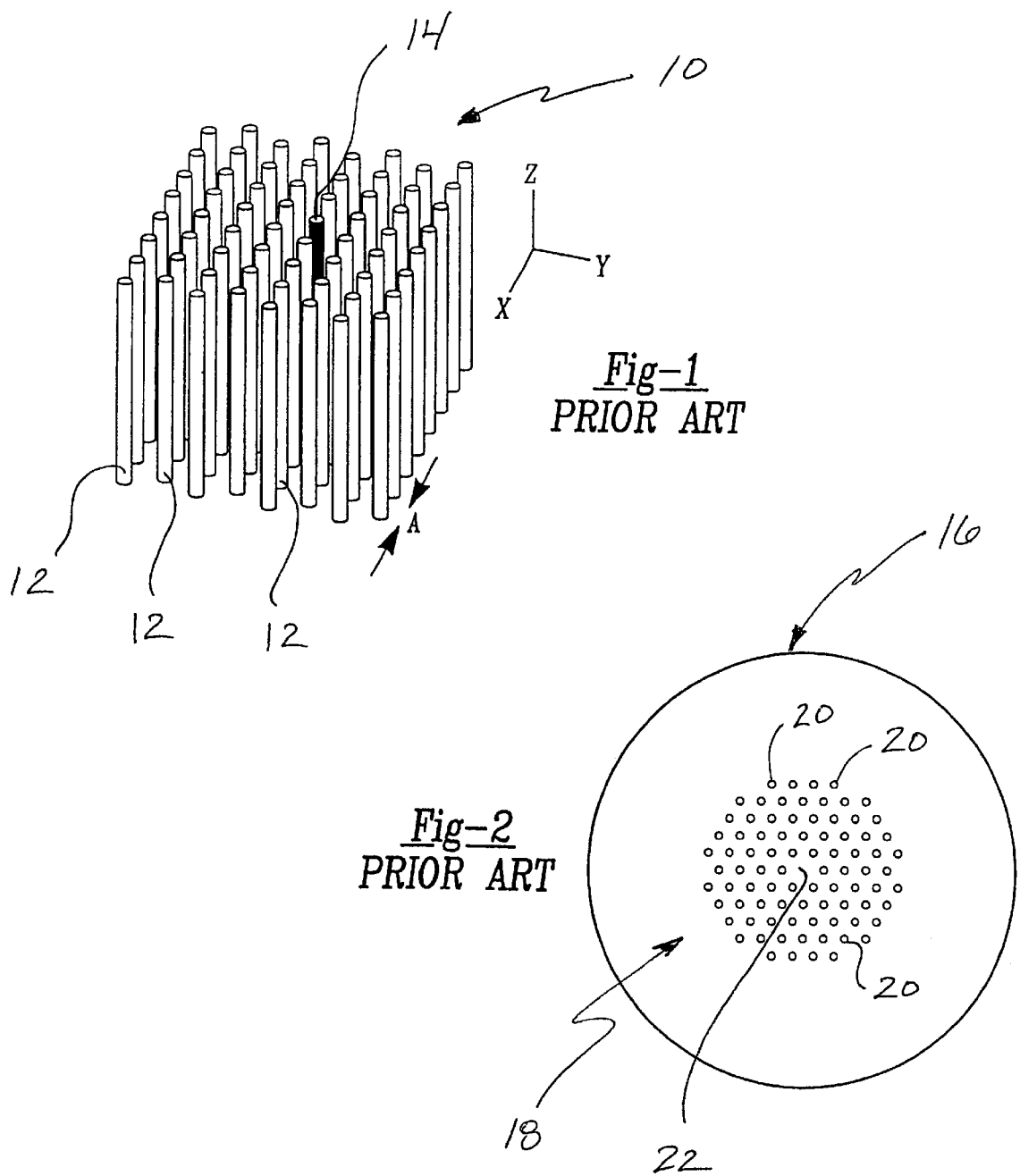
FIG. 1 is a perspective view of an exemplary two-dimensional photonic crystal structure.
FIG. 2 is a cross-sectional view of a photonic crystal fiber known within the prior art.
Figure 3A:
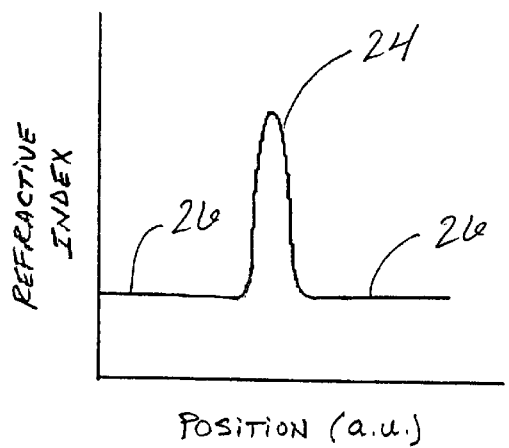
FIGS. 3A–3C are graphs showing the index profiles of various optical fibers.
Figure 3B:
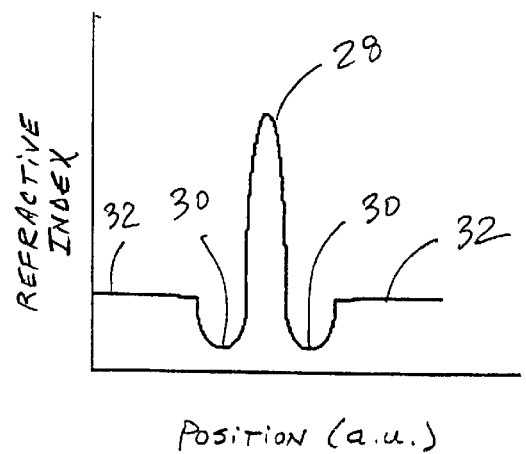
Figure 3C:
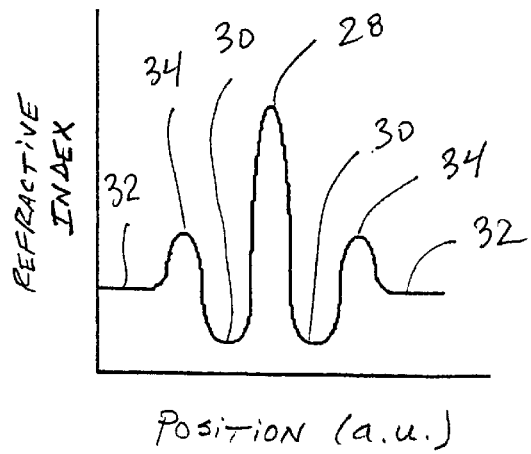

Reference will now be made in detail to the present preferred embodiments of the invention, examples of which are illustrated in the accompanying drawings. Wherever possible, the same reference numerals will be used throughout the drawings to refer to the same or like parts.

Referring now to FIG. 4, a cross-sectional view of a dispersion compensating fiber (DCF) 40 is shown in accordance with a preferred embodiment of the present invention. DCF 40 includes a low index cladding region 42 formed around a high index fiber core or fiber core region 44. The cladding region 42 comprises a solid background matrix 48.

The core region 44, preferably formed from high index glass, is surrounded by a low index moat region 50 formed by a ring of air columns 52. As shown, the ring of air columns 52 are formed into the solid background matrix 48 of the cladding region 42. More specifically, the moat region 50 is disposed directly around the core region 44, and between the core region 44 and the cladding region 42. While a ring of six air columns 52 is preferred, one skilled in the art will appreciate that the ring may include any number of air columns ranging from three (3) air columns up to twelve (12) air columns. Alternatively, the ring of columns 52 may be formed from a solid material having a low index of refraction. A particular feature of the moat region 50 is that the columns 52 contact the outer circumference of the column structure forming the core region 44.

Also shown in FIG. 4 is that a periodic lattice of columns 56 surrounds the moat region 50. Preferably the lattice of columns 56 are formed from a solid material including but not limited to glass. FIG. 5 shows an alternate preferred embodiment of the dispersion compensating fiber (DCF) 40 of FIG. 4. More specifically, DCF 40' includes a solid ring 58 which replaces the periodic lattice of columns 56. Preferably, the lattice of columns 56 and the solid ring 58 are formed from a material having an index of refraction between that of the fiber core 44 and the background matrix 48.

With reference to FIGS. 4 and 5, the purpose for including the moat region 50 is to effectively produce a low index extended core region 54 at longer wavelengths when compared to the diameter of the fiber core region 44. For example if the core region 44 has a diameter of 2 micrometers, longer wavelengths would be those wavelengths which exceed 2 micrometers. The low index extended core region 54 therefore includes the core region 44 and the moat region 50 at longer wavelengths. This prevents the cladding region 42 and especially the lattice of columns 56 or the solid ring 58 of the dispersion compensating fiber structure from acting as a waveguide. When the wavelength becomes short enough to resolve the structure in the extended core region 54, the optical fiber 40 begins to guide and the turn-on of the fundamental mode shows a highly dispersive feature, and preferably a highly negative dispersive feature.

The background matrix 48 which surrounds the core region 44 is chosen such that the effective cladding index is between the index of the core region 44 and the index of the moat region 50. This is sometimes referred to as an intermediate-index cladding region. While it is preferred that the background matrix 48 and cladding region 42 are formed from a solid pure silica material, other solid material such as fluorine doped silica or germanium doped silica can be used. While not specifically shown, an absorptive polymer coating is typically applied to the outer surface of the cladding region 42 and optical fiber 40.

A particular feature of DCF 40 is that the core region 44 is substantially larger in diameter than the column structures forming the moat region 50. As a result, the core region 44 functions as a defect in the lattice structure for guiding light through the waveguide. The fiber core region 44 is preferably formed from solid silica, which has an index (n) of about n=1.45. However, the core region 44 may also be formed from doped silica for altering the index characteristics and raising the index to as high as about n=1.48. Thus, DCF 40 has a structure which is similar to a photonic crystal fiber, but primarily relies upon effective index properties for achieving its unique dispersion characteristics.

FIG. 6 shows the preferred index profile for DCF 40. More particularly, the index profile for the high index core region 44 is shown at 60. The index profile for the air columns 52 forming the moat region 50 are shown at 62, and as will be appreciated define a refractive index value that approaches n=1.0, the refractive index for air. The index profile for the solid background matrix 48 is shown at 64. The index profile for either the periodic lattice of columns 56 or the solid ring 58 surrounding the moat region 50 is shown at 66.

Figure 7:
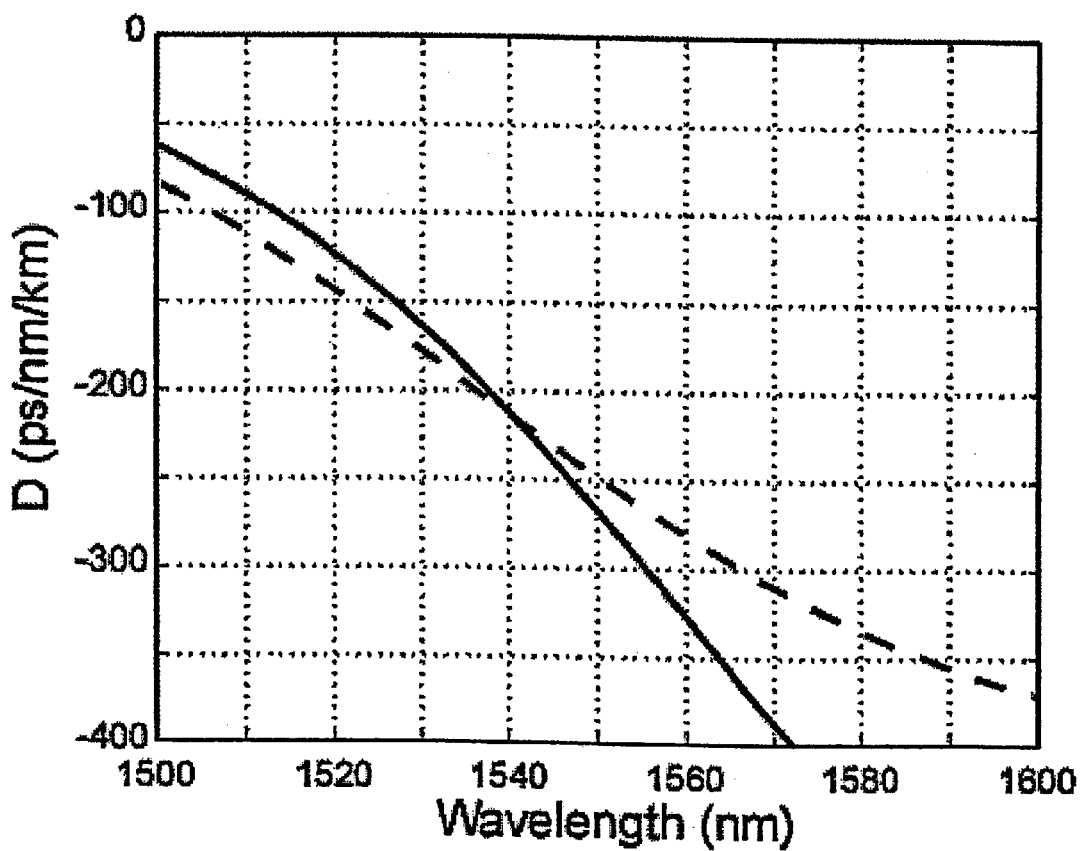
FIG. 7 is a graph showing the dispersion characteristics of the optical fiber structures of FIGS. 4 and 5.

The amount of dispersion is controlled by the ratios between the three indices (core, moat and cladding), by the ratio of the core region 44 and moat 50 diameters, and by the profile of the core region. The exact design of the fiber will be dependent on the intended application by a typical dispersion curve as shown in FIG. 7. As will be appreciated, larger air columns 52 in the moat region 50 increase the dispersion, but also greatly increase the dispersion slope, as shown in FIG. 7, making slope compensation more difficult.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A fiber optic waveguide comprising:
   a core region;
   a moat region surrounding the core region;
   a cladding region surrounding the moat region, the cladding region including a lattice of column structures disposed within a solid background matrix, the lattice of column structures being formed from a solid material and having a refractive index which is higher than the refractive index of the background matrix and lower than the refractive index of the core region.

2. The waveguide of claim 1 wherein the core region is formed from high index glass.

3. The waveguide of claim 1 wherein the moat region is formed from a material having a low index of refraction.

4. The waveguide of claim 1 wherein the moat region is formed from a ring of solid columns having a low index of refraction.

5. The waveguide of claim 1 wherein the moat region is formed from a ring of air columns which surround the core region.

6. The waveguide of claim 5 wherein the ring of air columns includes six air columns.

7. The waveguide of claim 1 wherein the cladding region having an effective refractive index which is higher than the refractive index of the moat region and lower than the refractive index of the core region.

8. The waveguide of claim 1 wherein the lattice of column structures is formed from glass.

9. The waveguide of claim 8 wherein said lattice of column structures comprises a ring of column structures surrounding said moat region.

10. The waveguide of claim 1 wherein the resulting fiber optic waveguide produces dispersion altering characteristics.

11. The waveguide of claim 1 wherein the core region functions as a defect in the lattice of columns for guiding light within the fiber optic waveguide.

12. A fiber optic waveguide for altering the dispersion characteristics of a signal transmitted along the waveguide comprising:

a high index core region;

a low index moat region surrounding the core region;

a cladding region surrounding the moat region and the core region, the cladding region including a lattice of solid material columns disposed within a solid background matrix, the lattice of solid material columns having a refractive index which is higher than the refractive index of the background matrix and lower than the refractive index of the core region; wherein a diameter of the core region is sized for making contact with the moat region for creating an extended core region at long wavelengths, and wherein the resulting fiber optic waveguide produces dispersion altering characteristics.

13. The waveguide of claim 12 wherein the moat region is formed from a ring of air columns which surround the core region.

14. The waveguide of claim 13 wherein the ring of air columns includes at least six air columns.

15. A fiber optic waveguide comprising:

a core region;

a moat region surrounding the core region, such that the moat region is formed from a ring of air columns which surround the core region;

a cladding region surrounding the moat region and the core region, the cladding region including a ring of solid material surrounding said moat region and disposed within a solid background matrix, the ring of solid material having a refractive index which is higher than the refractive index of the background matrix and lower than the refractive index of the core region; wherein a diameter of the core region is sized for making contact with the moat region.

* * * * *